(12) United States Patent
Takahashi et al.

(10) Patent No.: US 11,934,720 B2
(45) Date of Patent: Mar. 19, 2024

(54) IMAGE FORMING APPARATUS THAT ENABLES USER CONTROL OF PAPER USAGE, CONTROL METHOD FOR IMAGE FORMING APPARATUS, AND STORAGE MEDIUM

(71) Applicant: CANON KABUSHIKI KAISHA, Tokyo (JP)

(72) Inventors: Yasuhiro Takahashi, Chiba (JP); Yurino Kojima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/833,167

(22) Filed: Jun. 6, 2022

(65) Prior Publication Data
US 2022/0413781 A1 Dec. 29, 2022

(30) Foreign Application Priority Data
Jun. 16, 2021 (JP) ................. 2021-100275

(51) Int. Cl.
*G06F 3/12* (2006.01)
*B65H 43/00* (2006.01)

(52) U.S. Cl.
CPC .......... *G06F 3/1238* (2013.01); *B65H 43/00* (2013.01); *G06F 3/1222* (2013.01); *G06F 3/1253* (2013.01); *B65H 2551/26* (2013.01); *B65H 2801/06* (2013.01)

(58) Field of Classification Search
None
See application file for complete search history.

(56) References Cited

U.S. PATENT DOCUMENTS

| | | | | |
|---|---|---|---|---|
| 2005/0111857 | A1* | 5/2005 | Negishi | G03G 15/6508 399/80 |
| 2006/0020805 | A1* | 1/2006 | Osaka | H04N 1/00464 713/176 |
| 2015/0043035 | A1* | 2/2015 | Iida | G06F 3/121 358/1.15 |
| 2015/0278648 | A1* | 10/2015 | Murata | G06K 15/16 358/1.12 |
| 2017/0109107 | A1* | 4/2017 | Kuroda | G06F 3/1285 |
| 2017/0206042 | A1* | 7/2017 | Kashiwagi | G06F 3/1222 |
| 2018/0181042 | A1* | 6/2018 | Ooba | G03G 15/502 |
| 2019/0026049 | A1* | 1/2019 | Aoki | G06F 3/1259 |
| 2019/0138252 | A1* | 5/2019 | Okada | G06F 3/1253 |
| 2019/0155556 | A1* | 5/2019 | Tsujita | G06F 3/1239 |
| 2022/0405023 | A1* | 12/2022 | Kojima | G06F 3/1239 |
| 2022/0413781 | A1* | 12/2022 | Takahashi | B65H 3/44 |

FOREIGN PATENT DOCUMENTS

JP 2019-085207 A 6/2019

* cited by examiner

*Primary Examiner* — Henok Shiferaw
(74) *Attorney, Agent, or Firm* — Canon U.S.A., Inc. IP Division

(57) ABSTRACT

An image processing apparatus that prevents erroneous use of paper by enabling registration of user identification of a user who can use a paper feed deck in information about each paper feed deck of the image processing apparatus and controlling paper feeding so that just the user associated with the user identification can use a paper feed deck to which the user identification was added.

8 Claims, 19 Drawing Sheets

FIG.14

< NO OPTIMAL PAPER >

REFILL PAPER

NECESSARY PAPER
- SIZE: B4
- TYPE: CARDBOARD 1

| 1 | A4/PLAIN PAPER 1 |
| 2 | A4/PLAIN PAPER 1 |
| 3 | A3/PLAIN PAPER 1 |
| 4 | A3/PLAIN PAPER 1 |
| 5 | -/- |

STOP  OK

FIG.17

< RESERVATION SETTINGS FOR PAPER FEED DECK 1 >

ENTER RESERVATION TIME

| 1702 | 1703 | 1704 |
|---|---|---|
| 2021 ▼ YEAR | 5 ▼ MONTH | 10 ▼ DATE |

START TIME  10:00  ~1705

END TIME  12:00  ~1706

1707
CONFIRMATION/ CANCEL OF RESERVATION STATUS

CANCEL ~1708

OK ~1709

IMAGE FORMING APPARATUS THAT ENABLES USER CONTROL OF PAPER USAGE, CONTROL METHOD FOR IMAGE FORMING APPARATUS, AND STORAGE MEDIUM

BACKGROUND

Field

The present disclosure relates to a method for an image forming apparatus capable of preventing erroneous usage of special print paper in a print environment in which a mixture of print paper for office documents and the special print paper is used.

Description of the Related Art

With recent increases in functionality and image quality of multi-function peripherals, enhancement of a finishing apparatus, and an increased number of sheet types that can be handled, there has been an increasing number of cases in which a print product that was previously output at a print factory being output by in-house printing with a multi-function peripheral installed in an office environment.

The multi-function peripheral used in such a print environment is also used for printing normal office documents in many cases, and there is a case where two types of plain paper for normal print and special print paper for in-house print are temporarily placed in paper feed decks at the same time. At this time, a user who performs in-house printing obtains an output product by designating a paper feed deck in which the user has placed paper and performing print (refer to Japanese Patent Application Laid-Open No. 2019-85207).

Since only the user who has placed paper knows whether the special print paper for in-house print has been placed, there is a case where a print job of another user who has designated the identical paper feed deck erroneously uses the special paper.

SUMMARY

According to an aspect of the present disclosure, an image forming apparatus includes a reception unit configured to receive information for specifying a paper feed unit from a user whose log-in to the image forming apparatus has been authenticated, and a prohibition unit configured to prohibit a user who is different from the user whose log-in has been authenticated from performing a print operation using the specified paper feed unit.

Further features will become apparent from the following description of exemplary embodiments with reference to the attached drawings.

BRIEF DESCRIPTION OF THE DRAWINGS

FIG. 14 illustrates a display example of a no paper error screen of the image forming apparatus according to the first exemplary embodiment.

FIG. 17 illustrates a display example of a paper feed deck reservation screen of an image forming apparatus according to a third exemplary embodiment.

DESCRIPTION OF THE EMBODIMENTS

Exemplary embodiments will be described in detail below with reference to the accompanying drawings. The following exemplary embodiments are not intended to limit the claimed invention, and all combinations of features described in the exemplary embodiments are not necessarily essential to a means for solving the issues of the present disclosure.

An image forming apparatus according to the present disclosure will be described with reference to the accompanying drawings. The image forming apparatus is multi-function peripheral including the features of a printer, copier, and facsimile, and forms an image on a sheet (recording medium).

Figure 1A:
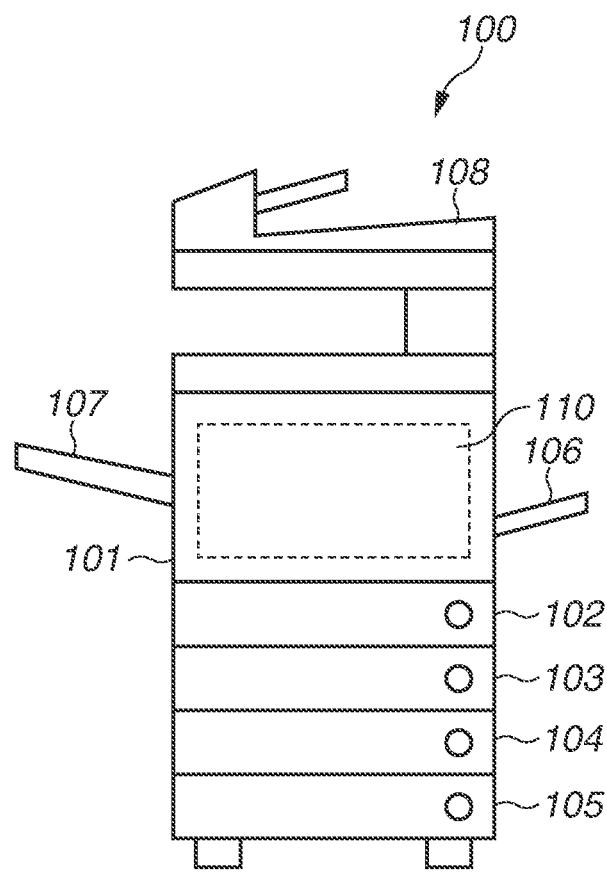
FIG. 1A is a front view of an image forming apparatus according to a first exemplary embodiment and FIG. 1B is a schematic diagram of a printer engine.

A first exemplary embodiment will now be described. An image forming apparatus 100 illustrated in FIG. 1A is a multi-function peripheral that forms an image on a sheet. The sheet can include, but is not limited to, paper, an envelope, a plastic film such as a sheet for an overhead projector (OHP), or a cloth. While terminology such as "paper" and "paper feed" may be used in the following description and associated drawings, the terminology is presumed to indicate a sheet in general, including a sheet other than paper, unless otherwise designated.

The image forming apparatus 100 includes devices including a printer unit 101, a scanner unit 108, a plurality of paper feed cassettes 102 to 105, a manual feed tray 106, and a discharge tray 107. The paper feed cassettes 102 to 105 and the manual feed tray 106 are hereinafter collectively referred to as a paper feed deck. The scanner unit 108 serves as an image reading apparatus that optically scans a document and converts data to electronic image information using a photo-electric conversion element of a charge-coupled device (CCD) system. The printer unit 101 causes a printer engine 110, which is an example of an image forming unit, to form an image on a sheet based on image information input from the scanner unit 108 or an external host computer.

Each of the paper feed cassettes 102 to 105 accommodates sheets, and the manual feed tray 106 supports sheets placed thereon. Sheets held by each of the paper feed cassettes 102 to 105 and the manual feed tray 106 are fed to the printer engine 110 while being separated one by one by a paper feed unit, which is not illustrated. Each of the paper feed cassettes 102 to 105 and the manual feed tray 106 are just examples of the paper feed deck that stores sheets supplied to the image forming unit, and any devices that would make up a paper feed deck that would enable practice of the present disclosure are applicable. The sheet on which the image is formed by the printer engine 110 is discharged onto the discharge tray 107, which is a discharge unit.

Figure 1B:
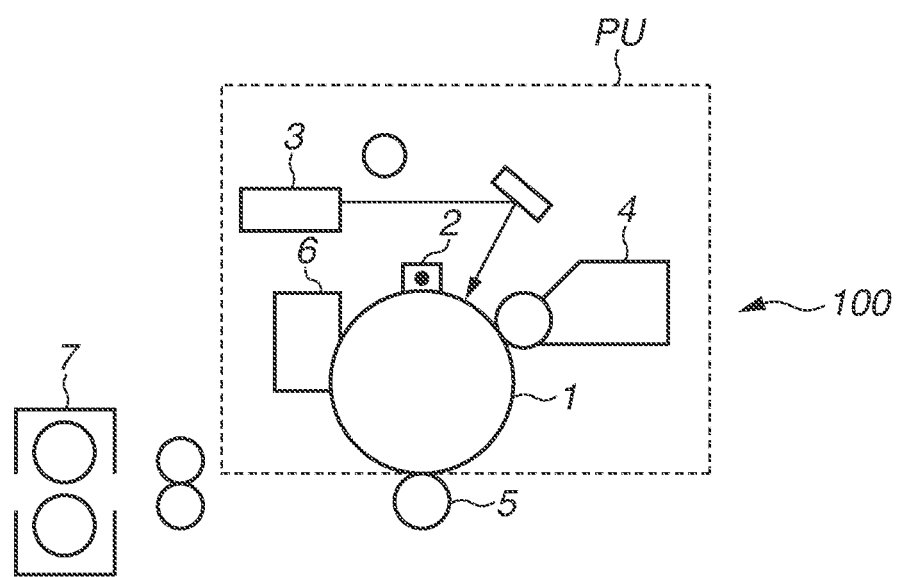

As illustrated in FIG. 1B, the printer engine 110 includes an image forming unit PU, which is based on an electrophotographic system. The image forming unit PU includes a photosensitive drum 1, which is a photosensitive member in a drum shape, a charging device 2, an exposure device 3, a developing device 4, and a cleaning device 6. When the printer engine 110 is requested to start an image forming operation, the charging device 2 uniformly charges the surface of the photosensitive drum 1 and the exposure device 3 scans the photosensitive drum 1 with laser light, thus forming an electrostatic-latent image on the surface of the photosensitive drum 1. The developing device 4 supplies charged toner to the photosensitive drum 1, and develops the electrostatic latent image into a toner image. The toner image held by the photosensitive drum 1 is transferred onto a sheet by a transfer device 5. The toner image transferred onto the sheet is fixed to the sheet by a fixing device 7 of, for example, a heat fixing system.

Figure 2:
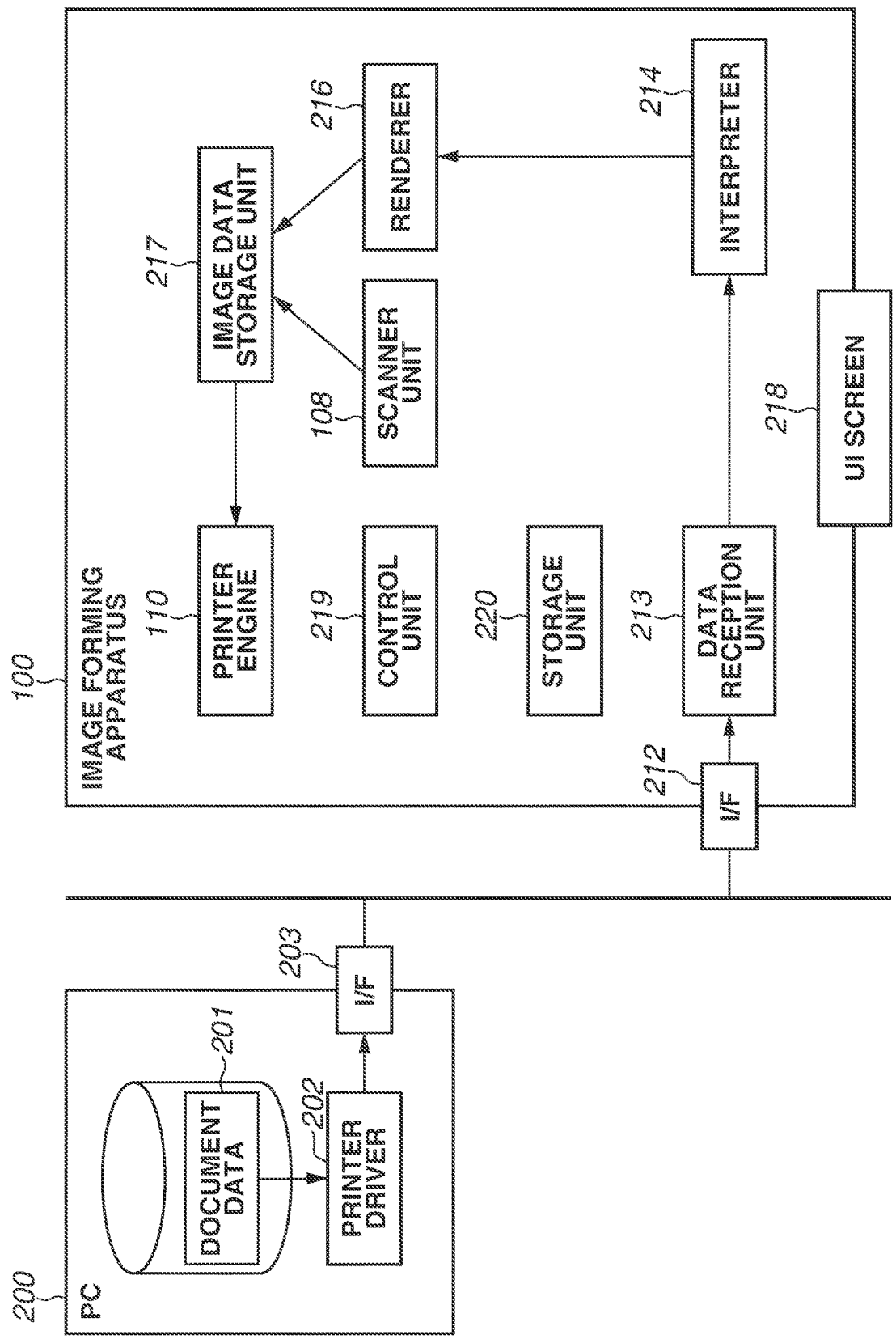
FIG. 2 is a functional block diagram of the image forming system according to the first exemplary embodiment.

An image forming system including the image forming apparatus 100 will be described with reference to FIG. 2. The image forming apparatus 100 is connected to a wired or wireless network via a communication interface (I/F) 212, and communicates with an information processing apparatus such as a personal computer (PC) 200.

A printer driver 202 serving as driver software that generates a job for instructing the image forming apparatus 100 to form an image (hereinafter, such a job is referred to as a print job) is installed in the PC 200. The printer driver 202 generates the print job described in a page description language (PDL), based on, for example, document data received from a document creation application of the PC 200. Examples of the PDL include, but are not limited to, PostScript (PS), Printer Control Language (PCL), and Laser Beam Printer Image Processing System (LIPS) (registered trademark). The PC 200 includes a central processing unit (CPU) a read-only memory (ROM), a random-access memory (RAM), and a hard disk drive (HDD) (not illustrated). The printer driver 202 transmits the generated print job to the image forming apparatus 100 via a communication interface 203 of the PC 200.

The image forming apparatus 100 includes control circuits (data reception unit 213, interpreter 214, and renderer 216) that implement respective specific functions, a control unit 219 that performs control of these control circuits, and storage devices (storage unit 220 and image data storage unit 217) that can temporarily or permanently store data. As described below, image data transmitted from the PC 200 is converted to image data in a raster format by the above-mentioned control circuits and then stored. Image information read from a document by the scanner unit 108 is also stored as image data. These pieces of image data are transmitted as a video signal to the printer engine 110, and used for an image forming operation by the printer engine 110.

The control unit 219 is a central processing unit that performs control of the image forming apparatus 100, and reads out and executes a control program stored in the storage unit 220. In the following description, each step of control processing of the image forming apparatus 100 is executed by the control unit 219 unless otherwise designated. The storage unit 220 includes a ROM, a RAM, an HDD, and the like. In addition to temporarily or permanently storing a control program and setting information of the image forming apparatus 100, the storage unit 220 is used as a work memory when the control unit 219 executes the control program.

The image forming apparatus 100 includes a user interface (UI) screen 218 that displays information. The UI screen 218 includes a display unit including a display, such as a touch panel with a software key function, and an operation unit including hardware keys, such as numeric keypads and a print start button.

The processing of executing image formation in the present exemplary embodiment will be described below with reference to FIG. 3.

Figure 3:
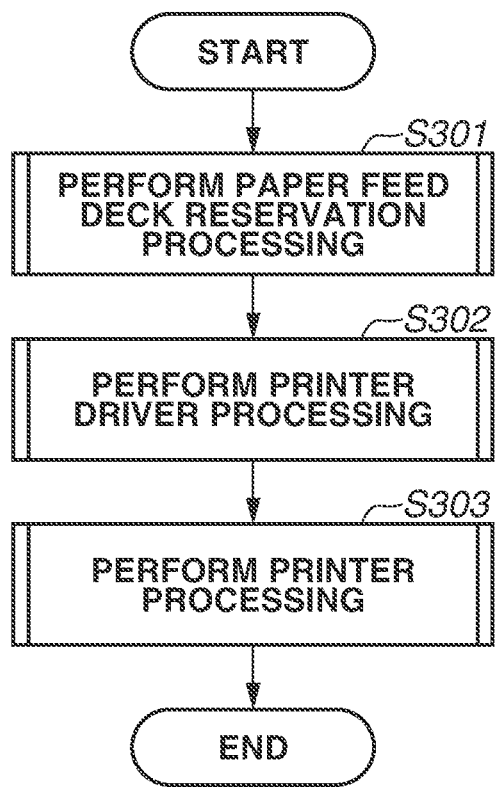
FIG. 3 is a flowchart illustrating processing of operations of the image forming system according to the first exemplary embodiment.

Turning to FIG. 3, in step S301, a paper feed deck reservation processing is executed. The processing of reserving a paper feed deck includes setting a user who can use each paper feed cassette and the manual feed tray in which sheets to be used for image formation are set. Details of this processing is described below. In the present embodiment, this processing is executed before image formation is executed. Next, in step S302, the PC 200 performs printer driver processing to generate a print job, and outputs the print job to the image forming apparatus 100. In step S303, when the print job is input to the image forming apparatus 100, the image forming apparatus 100 executes printer processing on the print job.

Figure 4:
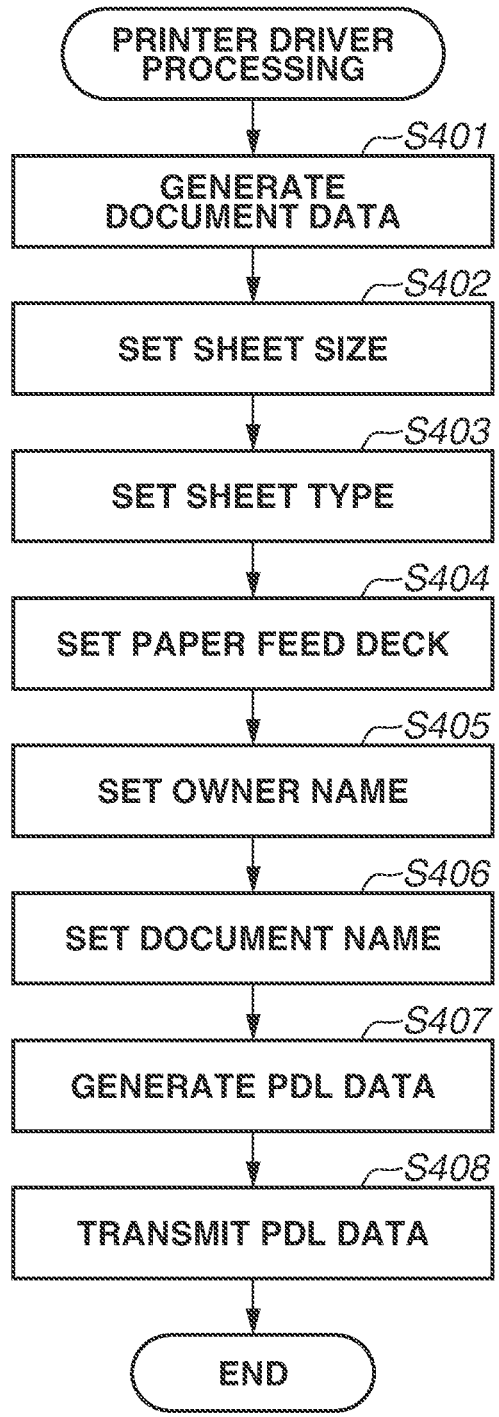
FIG. 4 is a flowchart illustrating details of printer driver processing of generating a print job according to the first exemplary embodiment.

The printer driver processing will be described with reference to the flowchart illustrated in FIG. 4. Each of the below-described steps is implemented by a controller, e.g., CPU, of the PC 200 executing a program constituting the printer driver 202. The printer driver processing is started, for example, when the user of the PC 200 performs an operation of instructing the document creation application to perform printing. In step S401, document data indicating contents to be printed, e.g., a document, a drawing, etc., is preliminarily generated using the document creation application or the like.

Figure 15:
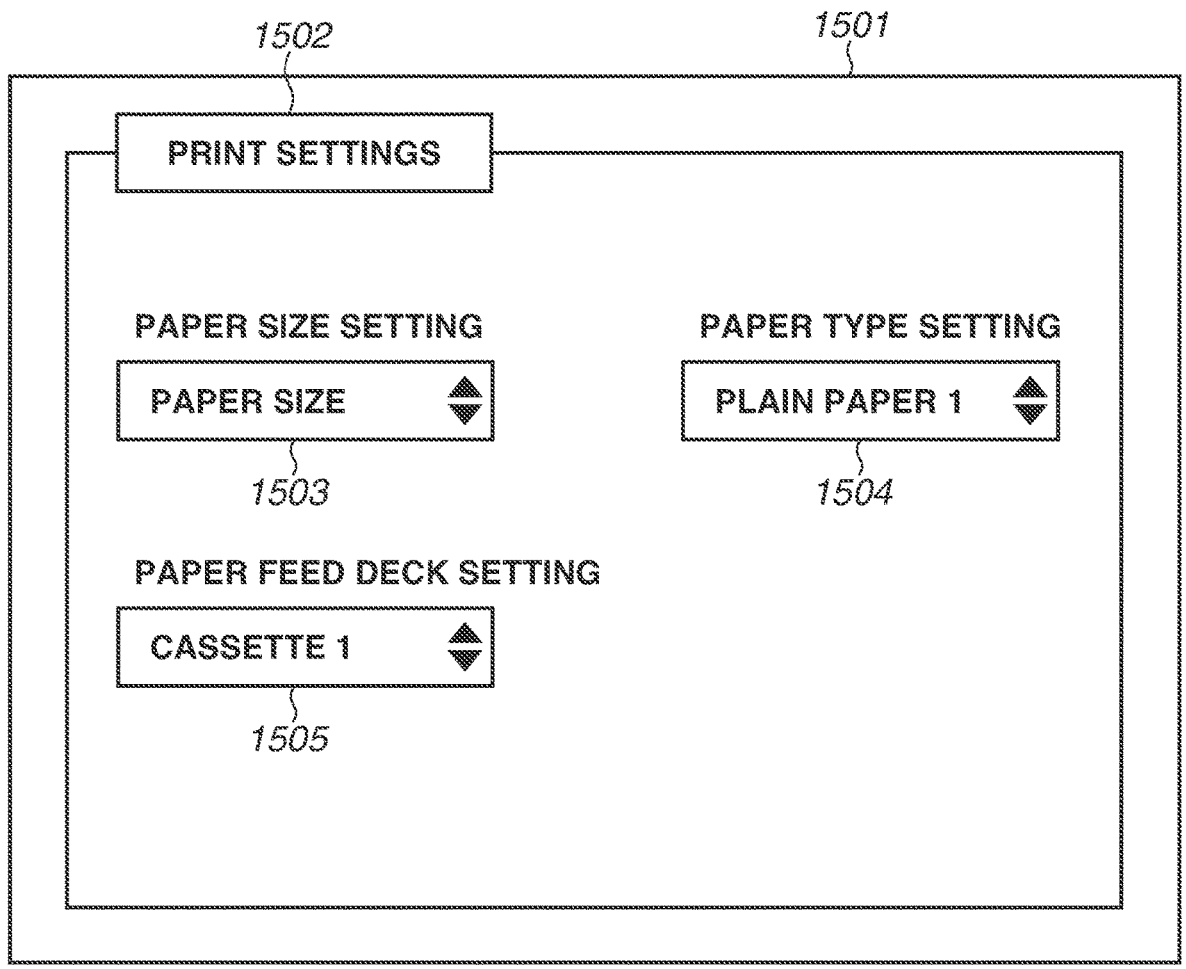
FIG. 15 is an image diagram illustrating a display example of a print condition setting screen displayed by driver software according to the first exemplary embodiment.

In steps S402 to S404, setting processing for setting attribute information for the print job is performed based on the user's operation to the PC 200. More specifically, as illustrated in FIG. 15, a setting screen 1501 for setting print conditions is displayed on the display of the PC 200, and the PC 200 becomes able to accept the user's operation. A screen for making print settings is displayed on a tab 1502. A setting value of a sheet size is displayed in a paper size setting field 1503. A setting value of a sheet type is displayed in a paper type setting field 1504. A paper feed deck that is designated as a feeding source of sheets is displayed in a paper feed deck setting field 1505. Examples of the sheet size that can be selected include, but are not limited to, a "document size" that designates the same size as that of document data, a standard size such as "A4", a user-defined size whose value is input by the user. Examples of the sheet type include, but are not limited to, a setting value of "plain paper 1", a setting value of "plain paper 2" having a basis weight that is larger than that of "plain paper 1", "coated paper", or the like. Any one of the paper feed cassettes 102 to 105 or the manual feed tray 106 can be selected as the paper feed deck. In another exemplary embodiment, an option, such as "automatic selection" where the image forming apparatus 100 automatically selects the sheet type and the paper feed deck is provided. The driver software sets information for designating the sheet size, the sheet type, and the paper feed deck serving as the feeding source of sheets based on the user's operation via the print setting screen 1501.

Next, in steps S405 and S406, the printer driver 202 sets an owner name and document name of the print job. The owner name is information for identifying the user who has created the print job. In the present exemplary embodiment, identification (ID) of a user currently logged into the PC 200, e.g., the ID of the user whose log-in has been authenticated) is set to the owner name. The document name is information for identifying a data file, such as a document or a drawing to be printed. The document name is acquired, for example, from an application that generates the document data.

In step S407, the printer driver 202 generates PDL data based on a PDL format based on the document data and various types of setting information. The PDL data includes page data indicating drawing contents of each page, and setting information for the print job, e.g., a sheet size, a sheet type, a paper feed deck, an owner name, a document name, and the like. The page data is image information generated by the printer driver 202 from the document data based on the PDL format. In step S408, the generated PDL data is transmitted to the image forming apparatus 100.

Figure 5:
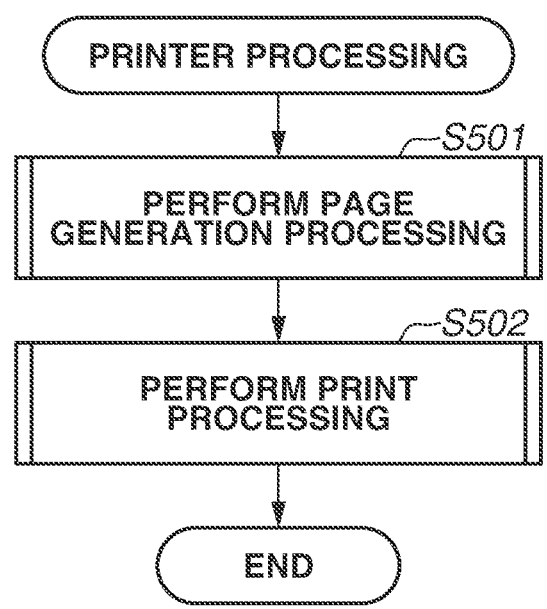
FIG. 5 is a flowchart illustrating details of printer processing executed by the image forming apparatus according to the first exemplary embodiment.

FIG. 5 illustrates a flowchart of the print processing according to the present embodiment, which is initiated when the control unit 219 of the image forming apparatus 100, receives the PDL data. As illustrated in FIG. 5, the printer processing includes page generation processing in step S501 and print processing in step S502. In step S501, the control unit 219 performs the page generation processing of generating rough image data on a page-by-page basis. In step S502, the control unit 219 performs the print processing of forming an image on the sheet based on the image data.

Figure 6:
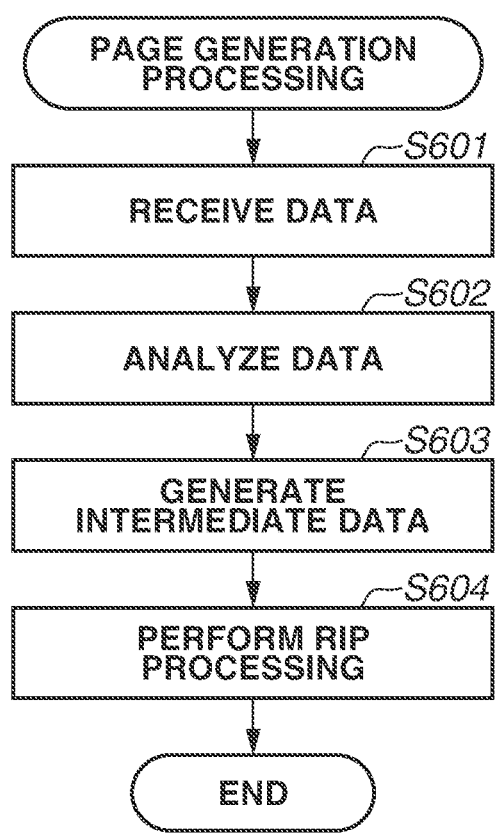
FIG. 6 is a flowchart illustrating details of page generation processing of the printer processing according to the first exemplary embodiment.

Details of the page generation processing will be described with respect to the flowchart illustrated in FIG. 6, with reference to FIG. 2. In step S601, the print job transmitted from the PC 200 is received by the data reception unit 213 and temporarily stored. The stored print job includes page data as image information in conformity with a PDL format. In step S602, the page data is analyzed by the interpreter 214. In step S603, the page data is converted to intermediate data. "Intermediate data" is a general term for drawing objects, such as bitmap data, run-length data, a trapezoid, a box, and bitmap data that has been subjected to high-speed boundary encoding, a background pattern, and a drawing logic for drawing an image in the raster format from the drawing objects and the background pattern. Setting information for the print job such as a sheet size included in the PDL data is extracted through analysis made by the interpreter 214, and stored by the control unit 219 in the storage unit 220.

In step S604, the renderer 216 performs raster image processing (RIP) on the intermediate data, and stores the intermediate data in the image data storage unit 217. The RIP represents processing of generating image data in the raster format from image data such as a vector image.

Figure 7:
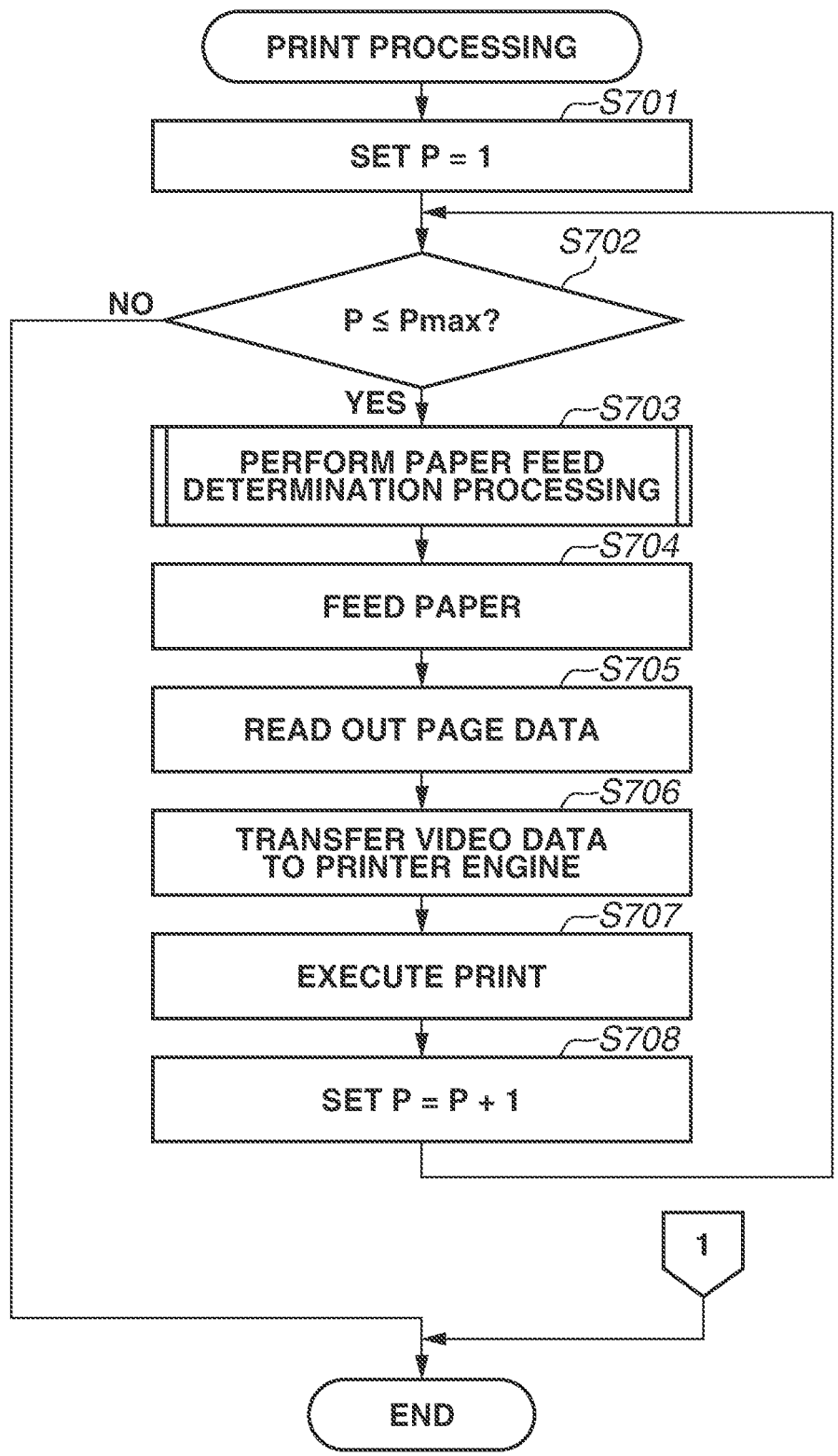
FIG. 7 is a flowchart illustrating details of print processing of the printer processing according to the first exemplary embodiment.

FIG. 7 illustrates a flowchart of print processing according to the present embodiment. In step S701, when the print processing starts, the control unit 219 initializes a parameter P indicating a page in process (current sheet). The parameter P is an integer value that satisfies P≥1. In step S702, the control unit 219 determines whether the parameter P exceeds a variable Pmax representing a total number of pages (the number of sheets designated in the print job). As long as P≤Pmax is satisfied, the control unit 219 repeatedly executes the processing of steps S703 to S708 described below. The variable Pmax is extracted through analysis of PDL data and stored in the storage unit 220.

In step S703, the control unit 219 acquires information about the paper feed deck setting (step S404 in FIG. 4) from the storage unit 220, and performs paper feed determination processing to determine whether a sheet can be supplied from a designated paper feed deck. In step S704, when the control unit 219 determines via the paper sheet determination processing that a sheet can be supplied, a single sheet is supplied. In step S705, the control unit 219 reads out image data of the sheet in process from the image data storage unit 217.

In step S706, the control unit 219 converts the image data to video data and transfers the video data to the printer engine 110. In step S707, the printer engine 110 executes print processing (image formation processing) on the sheet based on the video data. In step S708, the control unit 219 increments the parameter P. When image formation on sheets with a total number of pages (Pmax) ends (NO in step S702), the print processing ends.

Figure 8:
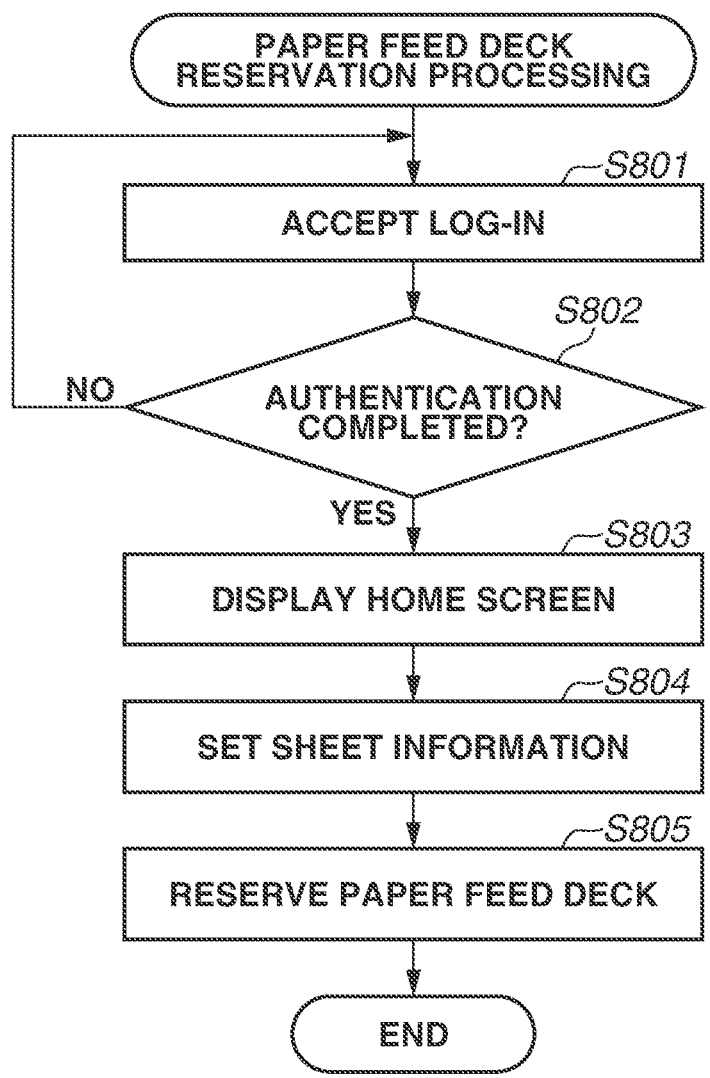
FIG. 8 is a flowchart illustrating details of paper feed deck reservation processing of the print processing according to the first exemplary embodiment.

FIG. 8 is a flowchart illustrating the details of reservation of a paper feed deck in step S301 of FIG. 3. The description herein is provided based on a user (user name: user 1) placing the following special sheet in the paper feed cassette 102 and performing an operation for reservation:
Sheet size: A4
Sheet type: coated paper
The user 1 initially places the above-described special sheet in the paper feed cassette 102. Then, the user 1 operates a user interface (UI) screen 218 of the image forming apparatus 100 to set the size and type of the placed sheet.

Figure 9:
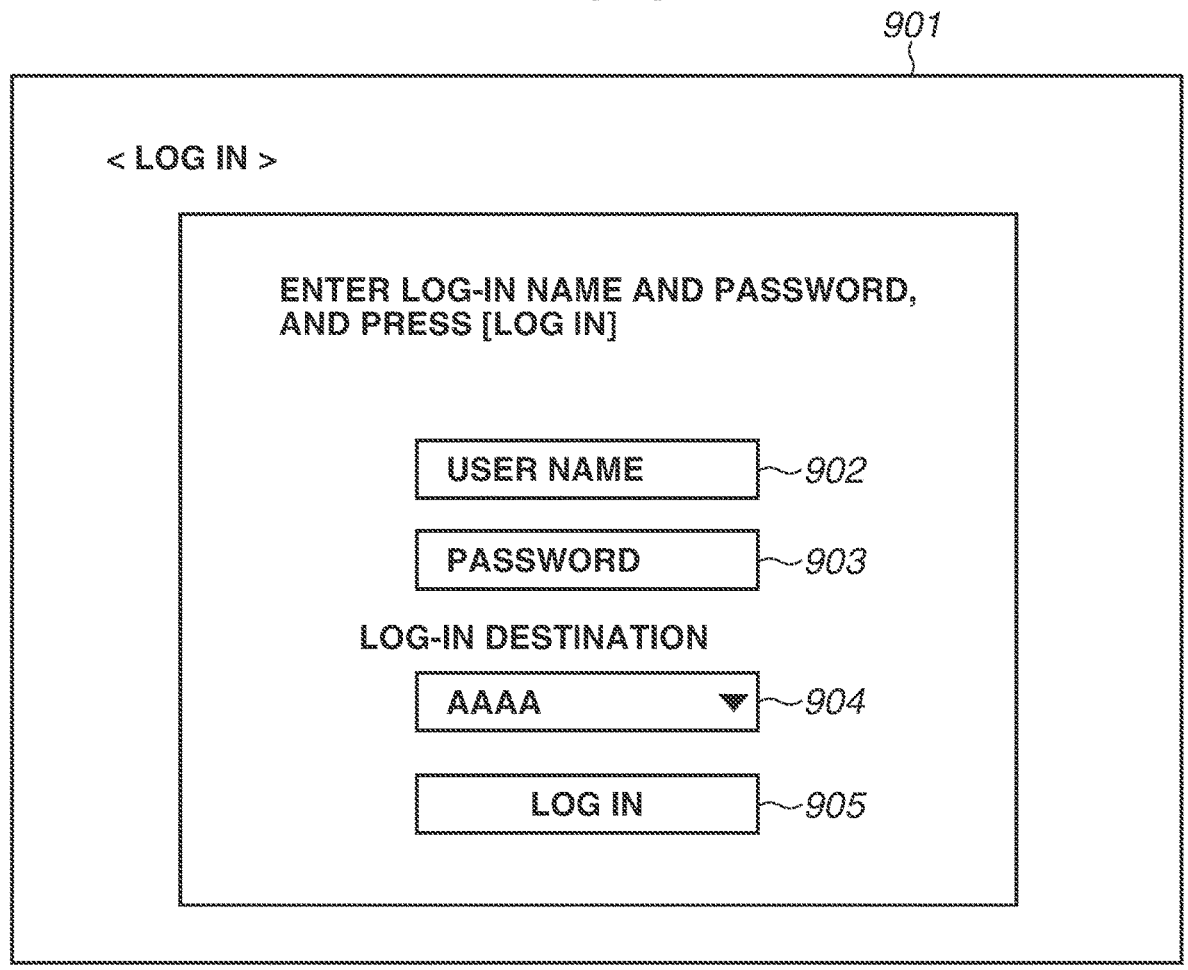
FIG. 9 illustrates a display example of a log-in screen of the image forming apparatus according to the first exemplary embodiment.
Figure 10:
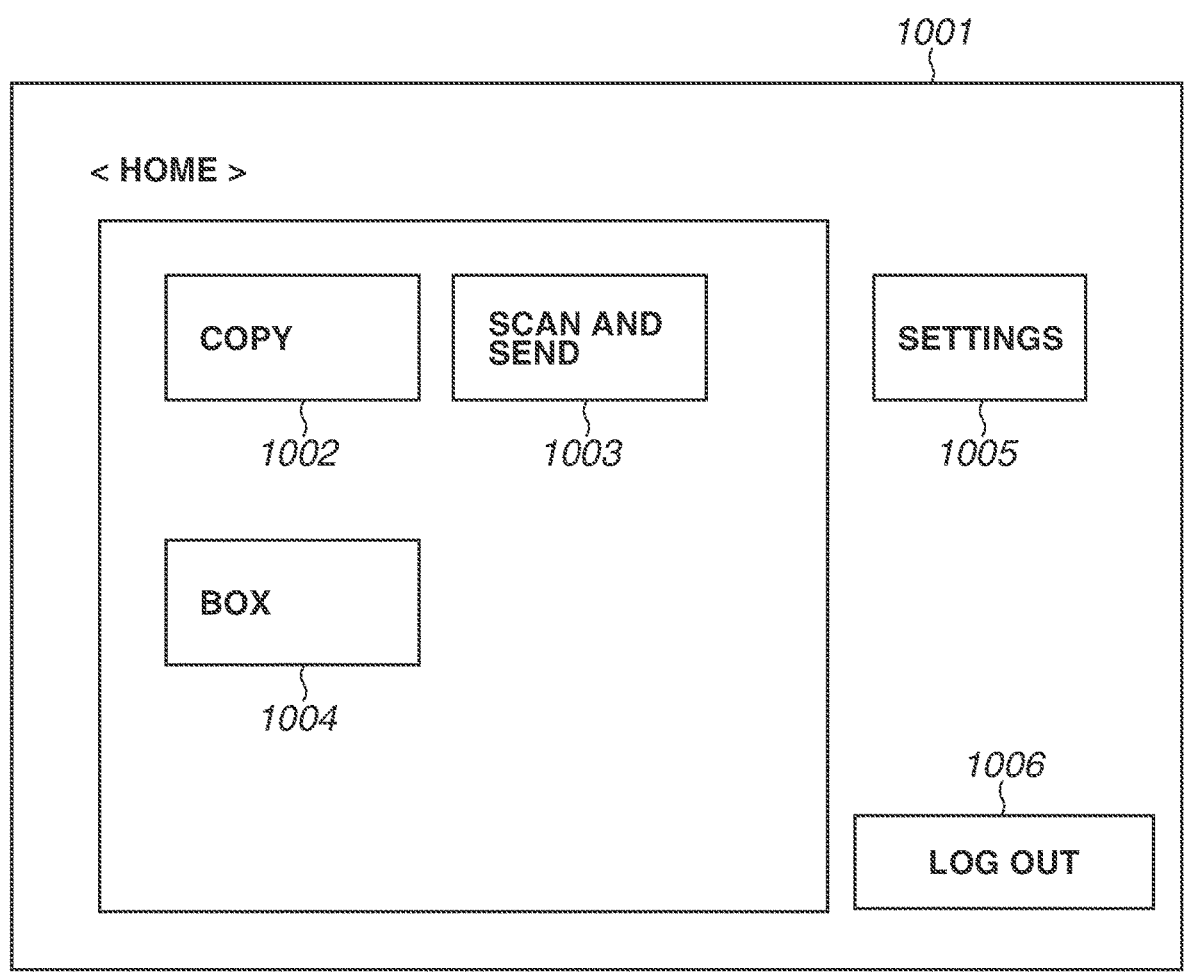
FIG. 10 illustrates a display example of a home screen of the image forming apparatus according to the first exemplary embodiment.

In step S801, the control unit 219 of the image forming apparatus 100 displays a screen 901 for performing user authentication illustrated in FIG. 9 on the UI screen 218, and waits for an operation from the user. Entry fields 902 and 903 for receiving a user name and a password, respectively, selecting field 904 for selecting a log-in destination, and a log-in button 905 for determining an entry and starting authentication processing are arranged on the screen 901 for performing user authentication. In step S802, in response to selection of the log-in button 905 being detected, the control unit 219 performs authentication processing based on input information and determines whether authentication is completed. If the authentication is completed (YES in step S802), the processing proceeds to step S803. In step S803, the control unit 219 displays a home screen 1001 illustrated in FIG. 10 on the UI screen 218.

Figure 11:
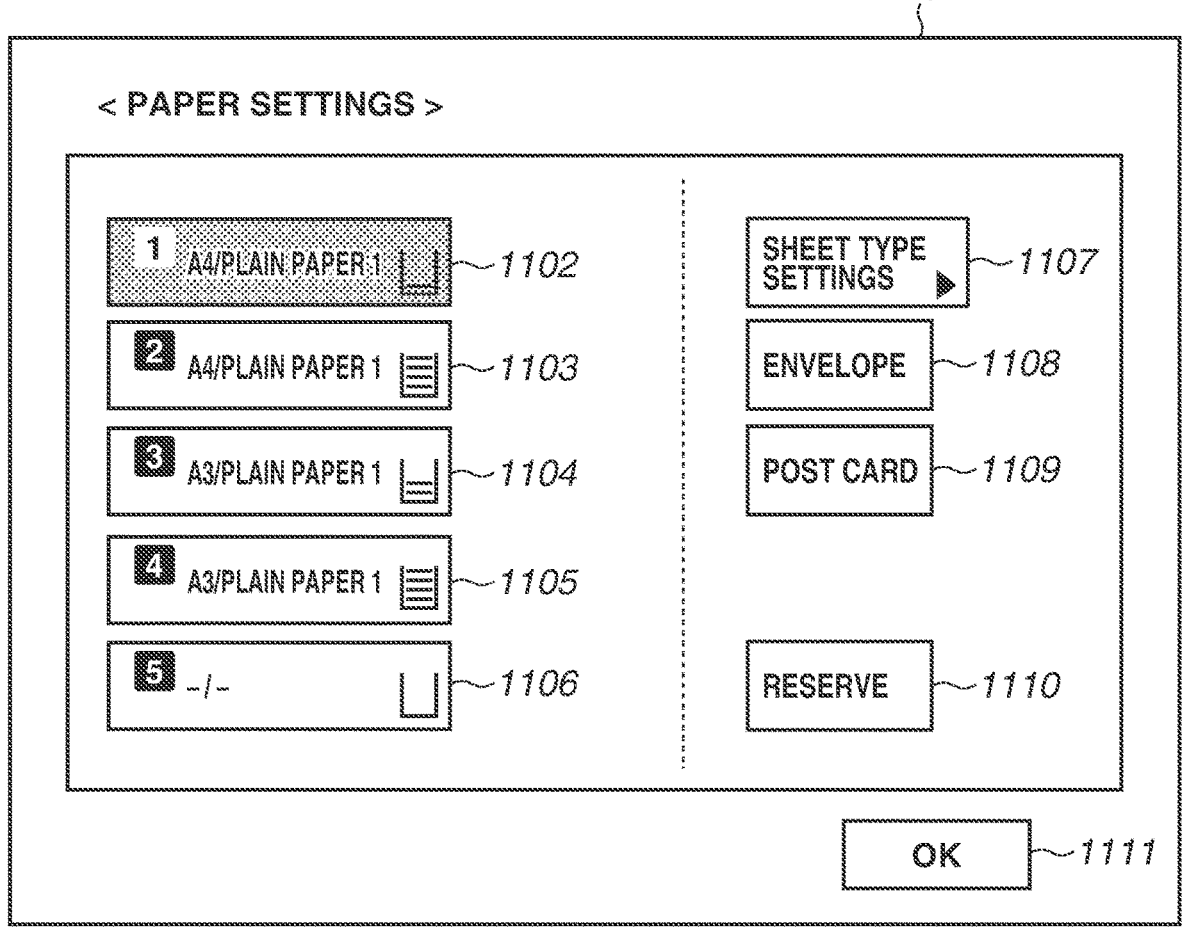
FIG. 11 illustrates a display example of a paper setting screen of the image forming apparatus according to the first exemplary embodiment.

A button 1002 that is selected in a case where a copy function is used, a button 1003 that is selected in a case where a send function is used, and a button 1004 that is selected in a case where a box function is used are arranged on the home screen 1001. A button 1005 is used for making various settings of the image forming apparatus 100, and is also selected in a case where the size and type of the sheet placed by the above-described user 1 are set and the paper feed deck is reserved. In response to selection of the button 1005 for making various settings being detected, the control unit 219 of the image forming apparatus 100 displays a screen for selecting various setting items (not illustrated). In step S804, in response to selection of a button for setting the sheet from among various setting items being detected, the control unit 219 displays a paper setting screen 1101 for setting a sheet illustrated in FIG. 11. Buttons 1102 to 1106 for paper feed deck selection are displayed on the paper setting screen 1101, and a setting status of each paper feed deck is displayed on each button. Details of these displays will be described below. A button 1107 for changing the sheet type, buttons 1108 and 1109 for setting the sheet size to a special size, such as an envelope and a postcard, and a reservation button 1110 are arranged on the paper setting screen 1101. Each of the setting buttons 1107 to 1110 is operated after selection of any one of the above-described buttons 1102 to 1106 for paper feed deck selection.

Details of the display of the buttons 1102 to 1106 for paper feed deck selection indicating setting statuses of respective paper feed decks will now described. The setting status of each paper feed deck is stored as paper feed deck information in the storage unit 220 of the image forming apparatus 100 as described in the following Table 1. A sheet size 2002 in the table is a size automatically detected by each paper feed deck when the sheet is placed or a size set by the user. A sheet type 2003 is set by using the button 1107 for setting the sheet type, and a sheet remaining amount 2004 represents a remaining amount detected by each paper feed deck in four levels. A person with a reservation 2005 in the table represents a user who can occupy a paper feed deck and is set by using the above-described reservation button 1110. In an example of the following Table 1, all of the reservation 2005 fields are blank, indicating that paper feed decks are available to anyone.

TABLE 1

Setting Status of Each Paper Feed Deck

| Paper Feed Deck (2001) | Sheet Size (2002) | Sheet Type (2003) | Remaining Sheet Amount (2004) | Person With Reservation (2005) |
| --- | --- | --- | --- | --- |
| Paper Feed Cassette 102 | A4 | Plain Paper 1 | 25% | — |
| Paper Feed Cassette 103 | A4 | Plain Paper 1 | 100% | — |
| Paper Feed Cassette 104 | A3 | Plain Paper 1 | 50% | — |
| Paper Feed Cassette 105 | A3 | Plain Paper 1 | 100% | — |
| Manual Feed Tray 106 | Not Set | Not Set | 0% | — |

Figure 12:
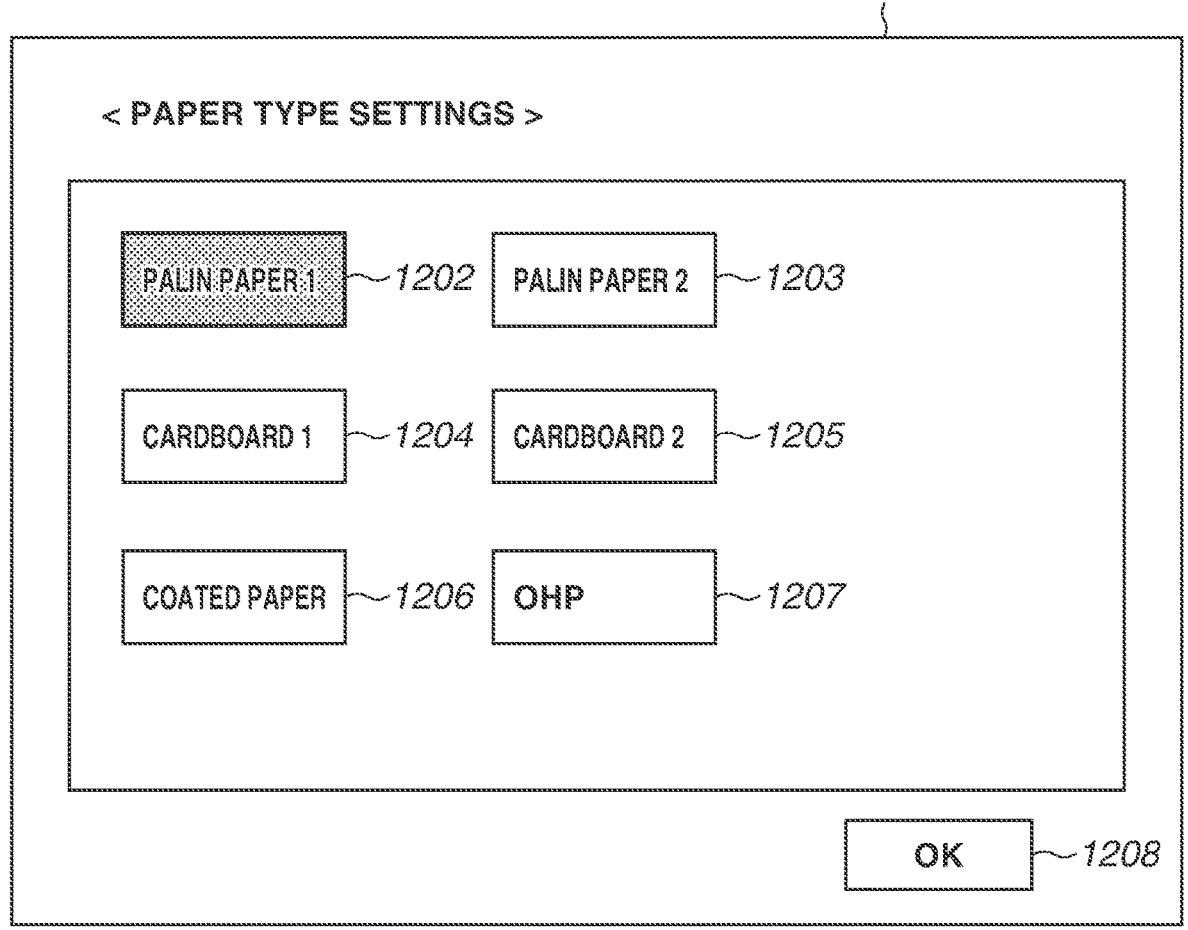
FIG. 12 illustrates a display example of a sheet type setting screen of the image forming apparatus according to the first exemplary embodiment.
Figure 13:
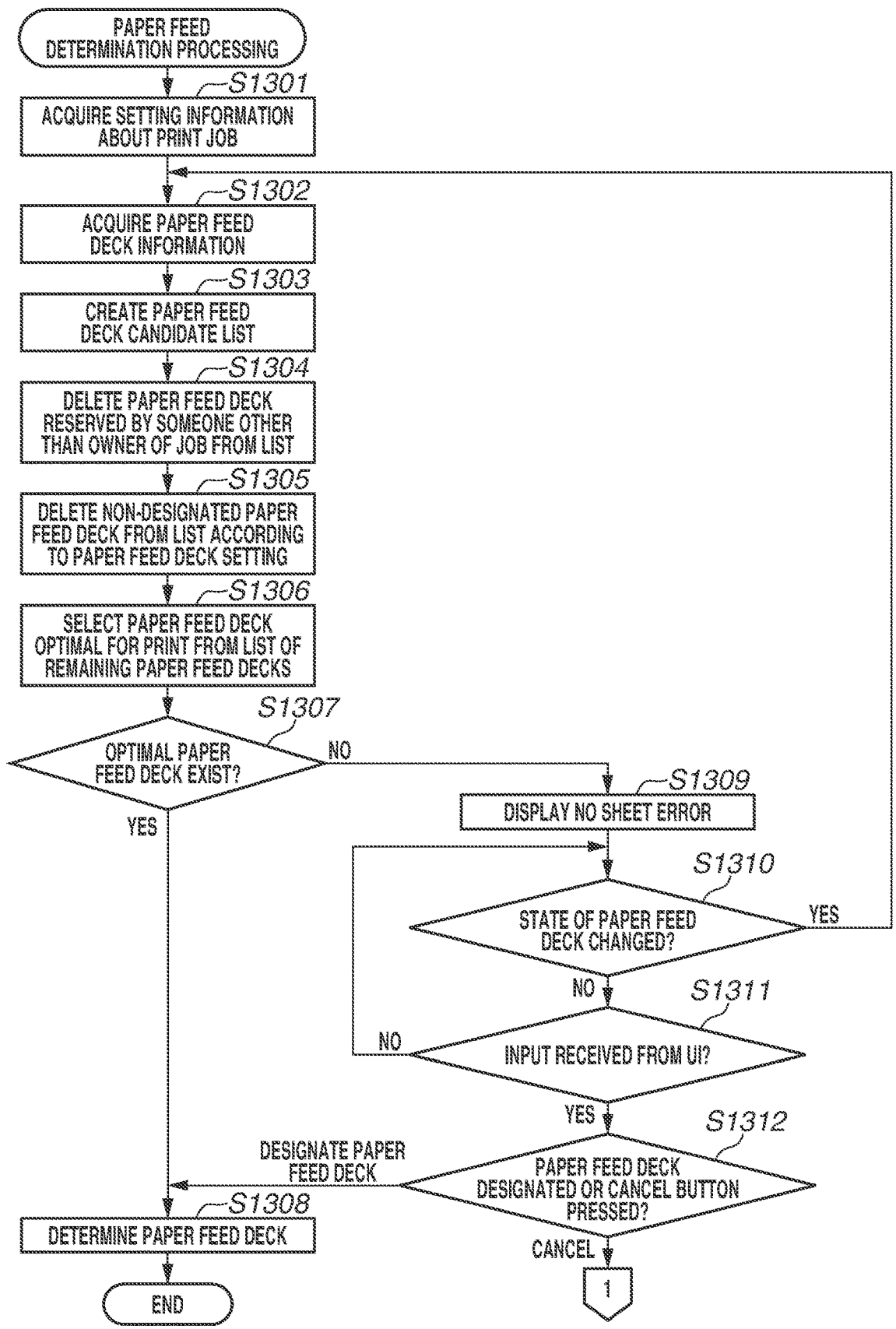
FIG. 13 is a flowchart illustrating details of paper feed determination processing of the print processing according to the first exemplary embodiment.

A description will now be provided of an operation performed when a paper feed deck is selected. For description purposes, the button 1102 corresponding to the paper feed cassette 102 is selected and the button 1107 for setting the sheet type is selected. In response to selection of the button 1107 for setting the sheet type being detected, the control unit 219 of the image forming apparatus 100 displays a paper type setting screen 1201 illustrated in FIG. 12 on the UI screen 218. The control unit 219 acquires a sheet type set to the selected paper feed deck (the paper feed cassette 102) from the paper feed deck information stored in the storage unit 220, and displays the sheet type. FIG. 12 illustrates that plain paper 1 (a button 1202) is set. In addition to the plain paper 1 (the button 1202), cardboard 1 (a button 1204), coated paper (a button 1206), and the like are arranged on the paper type setting screen 1201. The user selects a sheet type and selects an OK button 1208. The control unit 219 detects selection of the OK button 1208, updates the above-described paper feed deck information, and completes setting of the sheet type.

An operation for reserving the paper feed deck will now be described. For discussion purposes, the user 1 reserves the paper feed cassette 102. In step S805, in response to selection of the reservation button 1110 being detected in a state in which the button 1102 corresponding to the paper feed cassette 102 is selected, the control unit 219 of the image forming apparatus 100 stores a current log-in user name in a "person with a reservation" field of the paper feed deck information stored in the storage unit 220. This enables the user 1 to occupy the paper feed cassette 102. Selection of the reservation button 1110 again cancels reservation. In such a case, the "person with the reservation" field of the paper feed deck information stored in the storage unit 220 is cleared. A specific paper feed operation for occupying the paper feed deck will be described in the following explanation for the paper feed determination processing.

Table 2 indicates what changes are made to the paper feed deck information indicated in Table 1 by the change of the sheet type and the reservation processing.

TABLE 2

Setting status of each paper feed deck

| Paper Feed Deck(2001) | Sheet Size (2002) | Sheet Type (2003) | Remaining Sheet Amount (2004) | Person With Reservation (2005) |
| --- | --- | --- | --- | --- |
| Paper Feed Cassette 102 | A4 | Coated paper | 25% | User 1 |
| Paper Feed Cassette 103 | A4 | Plain Paper 1 | 100% | — |
| Paper Feed Cassette 104 | A3 | Plain Paper 1 | 50% | — |
| Paper Feed Cassette 105 | A3 | Plain Paper 1 | 100% | — |
| Manual Feed Tray 106 | Not Set | Not Set | 0% | — |

The paper feed determination processing in step S703 will now be described with respect to the flowchart illustrated in FIG. 14.

In step S1301, in the paper feed determination processing, the control unit 219 first acquires the setting information for the print job that is stored in the storage unit 220 in step S602. The setting information for the print job includes an owner name of the job, and a sheet size, a sheet type, and paper feed deck setting information to be used for print.

The sheet size, the sheet type, and the paper feed deck setting information, are automatically set values or specific values (respective values designating a specific sheet size, a specific sheet type, and a specific paper feed deck) that are included in the print job. In a case where the owner name of the job included in the print job is blank or automatically set, paper feed decks that have been reserved by somebody are all deleted in step S1304 as described below. In step S1302, the control unit 219 acquires the paper feed deck information stored in the storage unit 220. The paper feed deck information includes a summary of setting information for each paper feed deck illustrated in the above-described Table 2.

In step S1303, the control unit 219 duplicates the acquired paper feed deck information as a paper feed deck candidate list, and uses the paper feed deck candidate list for determining candidate paper feed decks for feeding paper in the following processing. In step S1304, the control unit 219 compares the person with the reservation 2005 recorded in each paper feed deck of the paper feed deck candidate list and the owner of the job acquired in step S1301, and, in a case where there is a paper feed deck reserved by someone other than the owner of the job, deletes the paper feed deck from the paper feed deck candidate list. In a case where the owner of the job is the user 1, the reservation status of the paper feed deck is as described in Table 2. In a case where there is no paper feed deck to be deleted from the paper feed deck candidate list and the owner of the job is someone other the user 1, the control unit 219 deletes the paper feed cassette 102 from the paper feed deck candidate list. With this configuration, only information about paper feed decks that are available to the owner of the job remains in the paper feed deck candidate list. In other words, usage of the paper feed deck that has been reserved by a user who is different from the owner of the job is prohibited.

In step S1305, the control unit 219 refers to the paper feed deck setting information from the setting information about the print job acquired in the previous processing in step S1301, and deletes paper feed decks other than the designated paper feed deck (other than the designated paper feed unit) from the paper feed deck candidate list. The paper feed deck setting information is one designated in the above-described paper feed deck setting field 1505. In a case where a specific paper feed deck is designated in the paper feed deck setting field 1505, the control unit 219 deletes paper feed decks other than the designated paper feed deck. In a case where automatic selection is made, the control unit 219 does not delete any of the paper feed decks from the paper feed deck candidate list.

In step S1306, the control unit 219 selects an optimal paper feed deck from the remaining paper feed decks in the paper feed deck candidate list. Specifically, the control unit 219 searches the paper feed deck candidate list to determine whether there is a paper feed deck that holds a sheet having a sheet size and a sheet type that are matched with those to be used for print described in the setting information for the print job. In step S1307, the control unit 219 switches the following processing depending on a result of searching for the paper feed deck. In step S1308, if the control unit 219 determines that the paper feed deck is found (YES in step S1307), the control unit 219 issues a notification for the subsequent stages of the paper feed deck, and ends the paper feed determination processing. In a case where the specific paper feed deck is designated and a value indicating that the sheet size and sheet type to be used for pint is automatically set is included in the print job, the specific paper feed deck that has been designated is selected in step S1306.

If the control unit 219 determines that the paper feed deck is not found (NO in step S1307), the control unit 219 displays, in step S1309, a no-sheet error screen 1401 that indicates the absence of sheets, which is illustrated in FIG. 14 on the UI screen 218 of the image forming apparatus 100.

Sheet information to be used to continue the print job (size and type) is displayed in a section 1409 on the error screen 1401 indicating the absence of sheets. The operations performable by the user at this time are any one of the following operations:

i) Placing a sheet described in the section 1409 in any one of the paper feed decks to eliminate a no sheet error.

ii) Selecting any one of buttons 1402 to 1406 for paper feed deck selection to force continuation of processing with a paper feed deck that accommodates a sheet different from the sheet described in the section 1409. At this time, it is desirable that the paper feed deck that has been reserved by a user other than the owner of the job be not displayed or displayed but turned in a gray-out state so that the paper feed deck cannot be selected.

iii) Selecting a stop button 1407 to stop execution of the print job.

The control unit 219 waits for execution of any one of the above operations performed by the user. In step S1310, the control unit 219 determines whether any change has been made to the state of the paper feed deck. If the control unit 219 determines that any change has been made to the state of the paper feed deck (YES in step S1310), for example, the user has placed paper, the processing returns to step S1302. In step S1302, the control unit 219 performs the processing of searching for the optimal paper feed deck again. If no change has been made to the state of the paper deck (NO in step S1310), then in step S1311, the control unit 219 determines whether an instruction from the user via the UI screen 218 has been detected. If the instruction has been detected (YES in step S1311), the processing proceeds to step S1312. In step S1312, the control unit 219 changes processing to be performed next depending on the instruction. In a case where any one of the buttons 1402 to 1406 for paper feed deck selection is selected, the control unit 219 issues a notification of the selected paper feed deck for the subsequent stages (step S1308), and ends the paper feed determination processing. In a case where selection of the stop button 1407 is detected, the control unit 219 ends the print processing.

As described above, the paper feed deck reservation processing can restrict usage by a person other than the person with the reservation. Thus, in a case where expensive paper such as coated paper is used, preliminarily reserving the paper feed deck in which the paper has been placed enables prevention of erroneous usage of paper by a person other than the person with the reservation.

Figure 16:
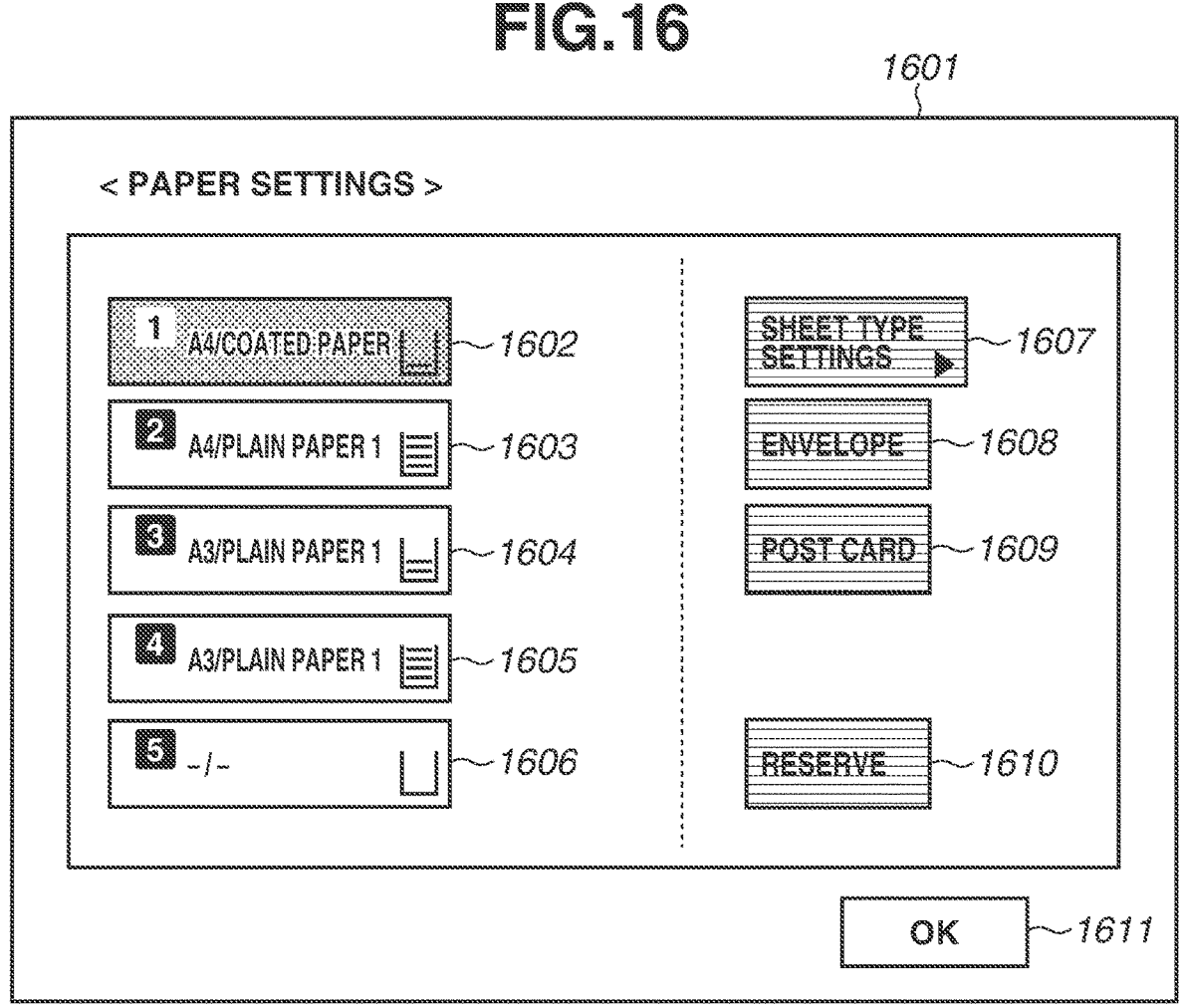
FIG. 16 illustrates a display example of a paper setting screen for a paper feed deck for a user different from a person with a reservation in an image forming apparatus according to a second exemplary embodiment.

A second exemplary embodiment of the present invention will now be described. The second exemplary embodiment includes all the configurations of the first exemplary embodiment with some additional configuration. Specifically, the following operational restriction is additionally included in the paper settings (in FIG. 11) of the above-described first exemplary embodiment. Details of the present configuration will now be described with reference to FIG. 16.

As described above, an operation for making the paper settings is performed by designation of the paper feed deck whose setting is to be changed using any of the buttons 1102 to 1106 for paper feed deck selection, and selecting any of the buttons 1107 to 1110 whose setting is to be subsequently changed. For example, in a case where a sheet type of a paper feed deck 1 (the paper feed cassette 102) is to be changed, the corresponding button 1102 for paper feed deck selection is selected, and thereafter the button 1107 for setting the sheet type is selected. The sheet size and the like can also be changed. In a case where the paper feed cassette 102 is in a state of already being reserved by the user 1, a restriction is put on an operation of the paper feed cassette 102 by a user other than the user 1. Specifically, in a case where the paper feed cassette 102 is selected by selection of a button 1602 for paper feed deck selection, the control unit 219 controls display to shade setting buttons 1607 to 1610, and place the setting buttons 1607 to 1610 in an unselectable state so that other users cannot make change to the settings. In a case where the user 1 with the reservation of the paper feed cassette 102 performs an operation, the setting buttons 1607 to 1610 are not shaded, and the settings can be changed without restriction. In a case where the user 1 selects a reservation button 1610 again to cancel the reservation, any user can change the settings of the paper feed cassette 102.

As described above, performing control to allow just the person with the reservation of a paper feed deck to change settings of the paper feed deck enables prevention of erroneous change in paper settings by a user other than the person with the reservation.

A third exemplary embodiment will now be described. The third exemplary embodiment includes all the configurations of the first and second exemplary embodiments with some additional configuration as described below. More specifically, in the present embodiment, while the reservation is made by selecting the reservation button 1110 in the paper deck reservation processing in step S301 in the above-described first exemplary embodiment, reservation time (a reservation period) is made settable as described below.

Figure 18:
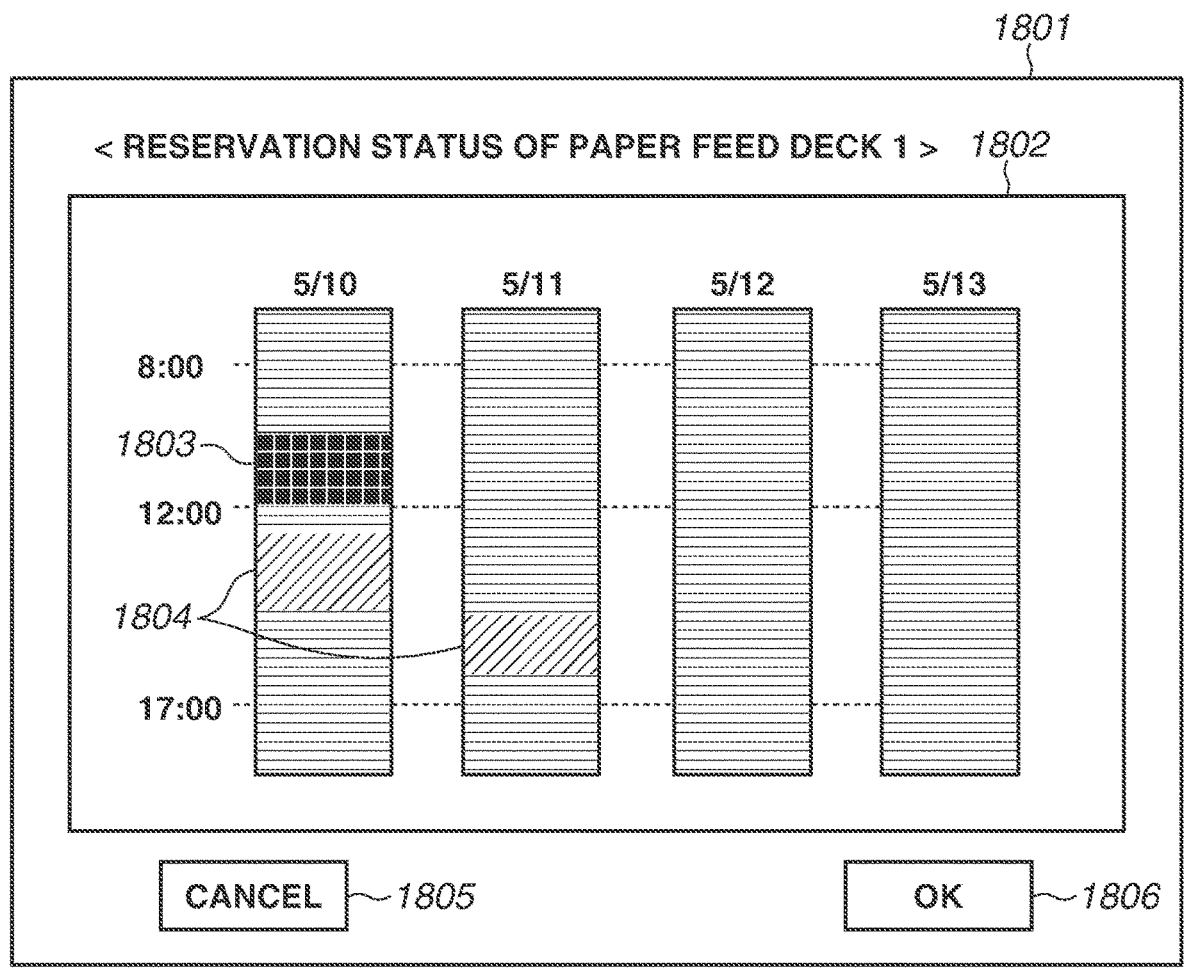
FIG. 18 illustrates a display example of a paper feed deck reservation status screen of the image forming apparatus according to the third exemplary embodiment.

Details of the configuration of the present embodiment will be described with reference to FIGS. 17 and 18. That is, the process of the reservation period in which the paper feed deck can be occupied is made settable will be described.

FIG. 17 illustrates a reservation time setting screen 1701 that is displayed on the UI screen 218 when the paper feed deck 1 (the paper feed cassette 102) is selected by selecting the button 1102 for paper feed deck selection in step S805, and thereafter the reservation button 1110 is selected. Fields 1702 to 1706 to which date and time for reserving the paper feed deck is entered are arranged on the reservation time setting screen 1701. The reservation time setting screen 1701 indicates that an entry for reserving the paper feed deck 1 (the paper feed cassette 102) from 10:00 to 12:00 on May 10, 2021 has been made. In addition, the item for the person with the reservation 2005 in the paper feed deck information indicated in Tables 1 and 2 is extended as described Table 3 below. More specifically, information indicating date and time for reservation (a year 2102, a month 2103, a date 2104, start time 2105, and end time 2106) can be recorded in addition to the information about the person with the reservation 2107. Since to need for managing reservations on a plurality of dates and times can arise, the reservations are managed with a list as described below as No. 2101. Table 3 indicates that two reservations have already been made to the paper feed deck 1 (the paper feed cassette 102). In response to selection of an OK button 1709 being detected, the control unit 219 confirms a reservation, updates the paper feed deck information for the paper feed deck 1, and the screen returns the original screen (the paper setting screen 1101). Table 4 indicates an example of a result of updating the paper feed deck information of the paper feed deck 1. The difference between Table 3 and Table 4 are reflected in Table 4.

TABLE 3

Reservation Status of Paper Feed Deck 1 (Paper Feed Cassette 102)

| No. (2101) | Year (2102) | Month (2103) | Date (2104) | Start Time (2105) | End Time (2106) | PersonWith Reservation (2107) |
|---|---|---|---|---|---|---|
| 1 | 2021 | 5 | 10 | 13:00 | 15:00 | User 2 |
| 2 | 2021 | 5 | 11 | 15:00 | 16:00 | User 2 |

TABLE 4

Reservation Status of Paper Feed Deck 1 (Paper Feed Cassette 102)

| No. (2101) | Year (2102) | Month (2103) | Date (2104) | Start Time (2105) | End Time (2106) | Person With Reservation (2107) |
|---|---|---|---|---|---|---|
| 1 | 2021 | 5 | 10 | 10:00 | 12:00 | User 1 |
| 2 | 2021 | 5 | 10 | 13:00 | 15:00 | User 2 |
| 3 | 2021 | 5 | 11 | 15:00 | 16:00 | User 2 |

When a cancel button 1708 is selected, the screen returns to the original screen (the paper setting screen 1101) without a reservation being made. In response to the control unit 219 detecting that selection of a button 1707 for confirming and canceling a reservation status, a reservation status screen 1801 for the paper feed deck illustrated in FIG. 18 is displayed on the UI screen 218. A timetable 1802 from which a reservation status for several days can be seen is displayed on the reservation status screen 1801. The control unit 219 creates and displays the timetable 1802 based on the paper feed deck information indicated in Table 3. In the timetable 1802, the time set on the above-mentioned reservation time setting screen 1701 is displayed (in a region 1803 filled with a grid pattern), and time in which a reservation has already been made is also displayed (in a region 1804 filled with black). The user can cancel reservation by selecting the region in which the reservation has been made and selecting a cancel button 1805. In such a case, the control unit 219 deletes the corresponding reservation information from the paper feed deck information in conjunction with selecting the cancel button 1805.

A description will now be provided of a change of the paper feed determination processing in step S703 along with the reservation time made settable. While the person with the reservation 2005 of the paper feed deck information and the owner of the job, which is acquired in step S1301 as described above, are compared in step S1304 in the first exemplary embodiment, in the present embodiment, a person with a reservation in a job execution time and the owner of the job are compared. For example, in a case where the paper feed deck information of the paper feed deck 1 is in a state indicated in Table 4 and the job execution time is 11:00 on May 10, 2021, the person with the reservation is the user 1, who is the first person with the reservation. Similarly, in a case where the job execution time is 14:00 on May 10, 2021, the person with reservation is a user 2, who is the second person with the reservation.

Figure 19:
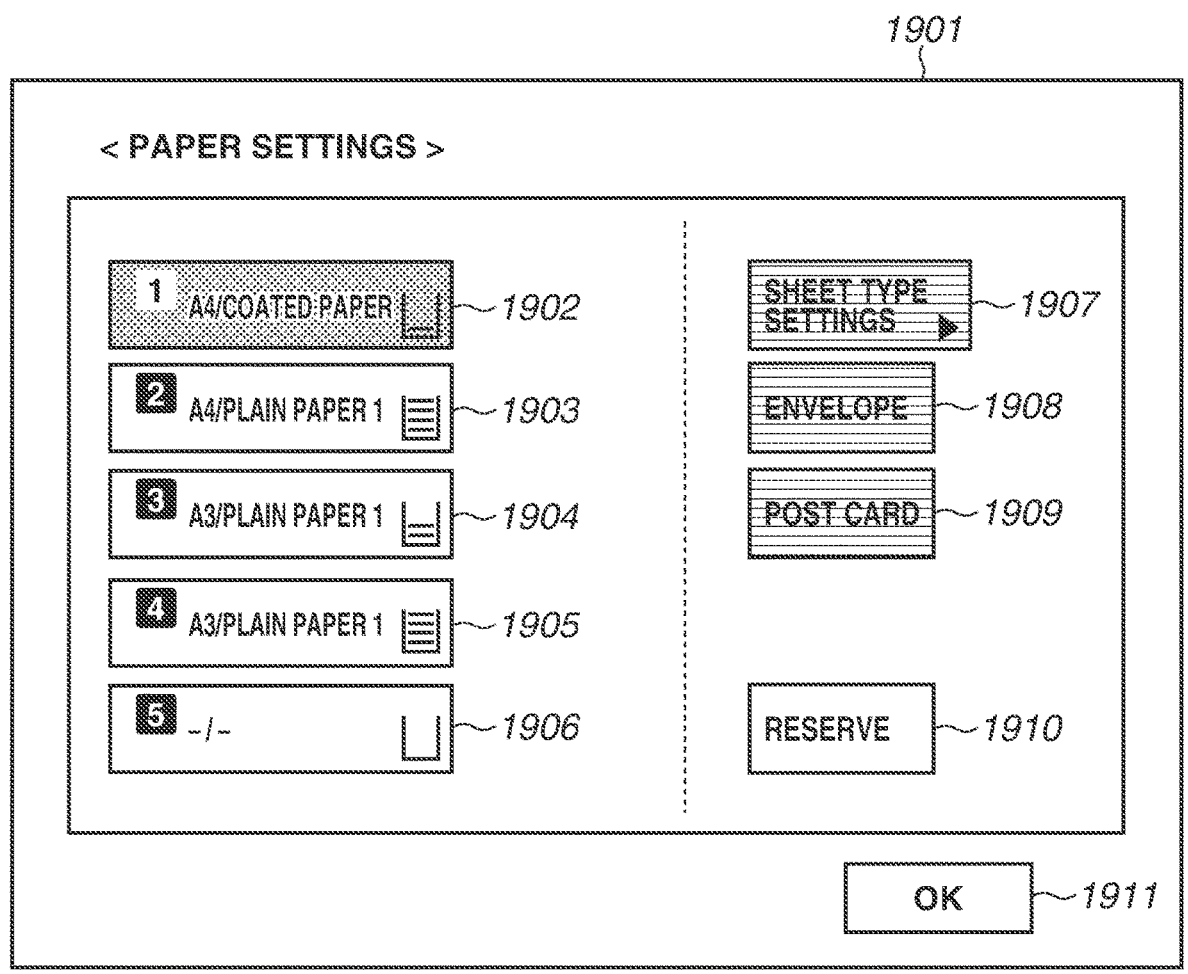
FIG. 19 illustrates a display example of a paper setting screen for a paper feed deck for a user different from a person with a reservation in the image forming apparatus according to the third exemplary embodiment.

A description will now be provided of a change of the method of restricting a change of the settings of the paper feed deck along with the reservation time made settable. In the second exemplary embodiment, to restrict the change of the settings by persons other than the person with the reservation of the paper feed deck, the setting buttons 1107 to 1110 are shaded as illustrated on a paper setting screen 1601. In the third exemplary embodiment, reservation time is made settable, so that a restriction on a change by shading of the setting buttons is switched depending on whether a person is the person with the reservation at operation time (an operation time). For example, in a case where the paper feed deck information about the paper feed deck 1 is in the state described in Table 4 and a person other than the user 1 selects the button 1602 for paper feed deck selection to select the paper feed deck 1 (the paper feed cassette 102) at 11:00 on May 10, 2021, the control unit 219 performs display as illustrated in FIG. 19. A difference between a paper setting screen 1901 and the paper setting screen 1601 described in the first exemplary embodiment is that a reservation button 1910 is not shaded. Shading is not performed so that a reservation can be made by a person other than the user 1 even if the operation is performed during reservation time of the user 1. The control unit 219 performs control so that cancellation of the reservation (a cancel button 1805) can be made just by the person with the reservation in any time.

In the first exemplary embodiment, the paper feed deck reserved by a user other than the owner of the job is deleted from the paper feed deck candidate list and is made unavailable. Since a reservation period is determined in the third exemplary embodiment, print can be performed after the reservation period elapses. In other words, the control unit 219 can set the paper feed deck to be ranked low in order of priority without deleting the paper feed deck from the paper feed deck candidate list when selecting the optimal paper feed deck in step S1306. In other words, the control unit 219 can perform control so that if there is any other paper feed deck whose settings for the paper size and the sheet type are matched, another paper feed deck is selected, and if there is no paper feed deck whose settings are not matched, the present paper feed deck (the paper feed deck that is currently reserved by the other user) is selected in step S1306. In this case, the print job is in a stand-by state without being printed until the reservation period expires, and the print job starts to be printed using the paper feed deck when the reservation period elapses.

As described above, making time for the reservation of the paper feed deck settable enables effective management and operation of paper feed deck reservations by a plurality of users.

The sheet type is information indicating a surface characteristic and thickness of a sheet and typically does not include a sheet size. For example, plain paper, cardboard, a sheet for an OHP, or the like are considered sheet types. Sheet size does not include the thickness of the sheet. In addition, paper is represented as a sheet in some cases, but the terms can be interchangeably used.

A fourth exemplary embodiment will now be described. While a description of the print job input from the printer driver 202 has been provided in the above-described first to third exemplary embodiments, a supplementary description will be provided of processing performed in a case of a copy job in the present exemplary embodiment. The present exemplary embodiment includes all the configurations of the first to third exemplary embodiments.

A main difference between the print job and the copy job is whether the page data read out from the image data storage unit 217 in the print processing in step S705 is generated based on data input from the printer driver 202 or generated by the scanner unit 108. Since there is basically no difference between the print job and the copy job in the paper feed deck reservation processing in step S301 and the paper feed determination processing in step S703, a description thereof in the case of the copy job is omitted.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described above, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-100275, filed Jun. 16, 2021, which is hereby incorporated by reference herein in its entirety.

What is claimed is:
1. An image forming apparatus, comprising:
a sheet holder; and
a controller;
wherein the controller receives an instruction for performing restriction of the sheet holder from a user whose log-in to the image forming apparatus has been authenticated,
wherein the controller receives, from the user, input of time at which the restriction is to be started, and
wherein the controller prohibits a user, who is different from the user whose log-in to the image forming apparatus has been authenticated, from performing a print operation using the sheet holder during a period which starts at the input time and during which the sheet holder is being restricted.

2. The image forming apparatus according to claim 1, wherein a sheet holder, other than the restricted sheet holder, is available to be used for a print operation by any user during the period.

3. The image forming apparatus according to claim 1, wherein information related to a sheet placed in the restricted sheet holder is changeable only by the user whose log-in to the image forming apparatus has been authenticated during the period.

4. The image forming apparatus according to claim 1, wherein the controller receives, from the user, time and date at which the restriction is to be started.

5. The image forming apparatus according to claim 1, further comprising a display,
wherein the controller causes the display to display a button for changing a sheet setting of the restricted sheet holder, the button being grayed out during the period.

6. The image forming apparatus according to claim 1,
wherein the controller further receives input of time at which the restriction is to be terminated, and
wherein the controller prohibits the user, who is different from the user whose log-in to the image forming apparatus has been authenticated, from performing the print operation using the restricted sheet holder during the period starting from the time at which the restriction has been started and ending at the time at which the restriction is to be terminated.

7. A method for an image forming apparatus having a sheet holder, the method comprising:
receiving an instruction for performing restriction of the sheet holder from a user whose log-in to the image forming apparatus has been authenticated;
receiving, from the user, input of time at which the restriction is to be started; and
prohibiting a user who is different from the user whose log-in to the image forming apparatus has been authenticated from performing a print operation using the sheet holder during a period which starts at the input time and during which the sheet holder is being restricted.

8. A non-transitory storage medium storing a program for executing a method for an image forming apparatus having a sheet holder, the method comprising:
receiving an instruction for performing restriction of the sheet holder from a user whose log-in to the image forming apparatus has been authenticated;
receiving, from the user, input of time at which the restriction is to be started; and
prohibiting a user who is different from the user whose log-in to the image forming apparatus has been authenticated from performing a print operation using the sheet holder during a period which starts at the input time and during which the sheet holder is being restricted.

* * * * *